United States Patent [19]  
Eitel

[11] 4,440,506  
[45] Apr. 3, 1984

[54] LASER POWER METER

[75] Inventor: Frederick G. Eitel, North Palm Beach, Fla.

[73] Assignee: The United States of America as represented by the Secretary of the Army, Washington, D.C.

[21] Appl. No.: 365,747

[22] Filed: Apr. 5, 1982

[51] Int. Cl.³ .............................................. G01K 17/00
[52] U.S. Cl. ..................................................... 374/32
[58] Field of Search ........................... 374/32; 250/352

[56] References Cited

U.S. PATENT DOCUMENTS 2,560,536  7/1951  Althouse .
3,464,267  9/1969  Ehrlich et al. .
3,596,514  8/1971  Mefferd et al. .
3,783,685  1/1974  Zeiders, Jr. et al. .
3,918,303  11/1975 Zakhidov et al. .
4,037,470  7/1977  Mock et al. .
4,194,119  3/1980  MacKenzie .......................... 250/352

FOREIGN PATENT DOCUMENTS 1271239  4/1972  United Kingdom .

Primary Examiner—Herbert Goldstein  
Attorney, Agent, or Firm—Robert P. Gibson; Anthony T. Lane; Saul Elbaum

[57] ABSTRACT

A laser power meter is disclosed which includes a housing, an optical window in the housing through which the laser radiation is transmitted, and an optic in the housing in the path of the laser radiation. The optic absorbs a portion of the incident laser radiation, the absorbed laser radiation being converted into heat, and reflects a portion of the incident laser radiation. The heat generated at the optic is transferred to a cooling fluid flowing through a flow channel adjacent the optic. The width of the flow channel is defined by the space between the optic and a gap control disk. Apparatus is provided for urging the gap control disk toward the optic in order to maintain the width of the flow channel in the event the width of the flow channel changes as a result of thermal distortions suffered by the optic.

15 Claims, 2 Drawing Figures

LASER POWER METER

RIGHTS OF THE GOVERNMENT

The invention described herein may be manufactured, used, and licensed by or for the United States Government for governmental purposes without the payment to me of any royalty thereon.

BACKGROUND OF THE INVENTION

The invention disclosed herein pertains to a laser power meter wherein incident laser radiation is converted to thermal energy which is transferred to a flowing fluid, the temperature rise and the flow rate of the fluid defining the power output of the laser.

Laser power meters wherein laser energy is transferred to a flowing fluid are disclosed in U.S. Pat. No. 3,464,267 to Ehrlich et al and U.S. Pat. No. 2,560,536 to Althouse. The laser power meter disclosed in U.S. Pat. No. 3,464,267 to Ehrlich et al includes a housing having a conical cavity. The laser radiation is directed onto the inner surface of the conical cavity where it is converted into thermal energy. A plurality of cooling fins are provided about the outer surface of the conical cavity. These fins project into a coolant passage about the outer surface of the conical cavity which is defined by a conical member which is coaxial with, and spaced from, the conical cavity. Water flowing through the coolant passage absorbs the thermal energy generated by the laser radiation impinging upon the inner surface of the conical cavity, resulting in a temperature increase of the water. The response rate of the apparatus is directly proportional to the flow rate of the water. The temperature increase of the water is sensed by temperature sensors which are incorporated in a bridge circuit where the amount of unbalance of the bridge is proportional to the temperature increase and hence to the average power in the laser beam.

U.S. Pat. No. 2,560,536 to Althouse discloses a device for measuring the power of electromagnetic radiation conducted through a wave guide. The Althouse device includes a wave guide load termination coupled to the wave guide. The load termination includes a horizontal top surface, vertical side walls, a vertical end plate, and a bottom wall. The bottom wall includes a horizontal portion and an upwardly inclined portion extending to the end plate. A thin film of water flows over the upwardly inclined portion of the bottom wall. This water is supplied through an inlet conduit arranged near the intersection of the horizontal and the upwardly inclined portions of the bottom wall, and the thin film of water flows out through an outlet conduit arranged at the intersection of the upwardly inclined portion of the bottom wall and the end plate. A shield is arranged within the load termination, which shield is parallel to, and spaced from, the upwardly inclined portion. A valve in the inlet conduit is adjustable to establish a constant fluid flow, of film thickness, over the entire surface of the inclined portion of the bottom wall. Temperature sensors are provided at the inlet and outlet conduits, the temperature differential measured by these sensors being directly proportional to the power of the electromagnetic energy directed into the wave guide load termination.

Other laser power meters are disclosed in the following patents: U.S. Pat. No. 3,596,514 to Mefferd et al; U.S. Pat. No. 3,783,685 to Zeiders, Jr. et al; U.S. Pat. No. 3,918,303 to Zakhidov et al; U.S. Pat. No. 4,037,470 to Mock et al; and British Pat. No. 1,271,239 to Paine.

While the prior art does disclose various types of laser power meters, wherein laser energy is transferred to a cooling fluid, the prior art does not disclose a laser power meter like that of the present invention.

SUMMARY OF THE INVENTION

The present invention is directed to a laser power meter which converts incident laser radiation into thermal energy and transfers the thermal energy to a cooling fluid flow, the temperature rise and rate of flow of the cooling fluid defining a measure of the power output of the laser. The present invention is also directed to apparatus for automatically adjusting the width of a flow channel conducting a flow of cooling fluid in heat exchange relation with an optic of the laser power meter of the present invention, which optic absorbs a portion of the incident laser radiation and converts it to thermal energy and is consequently prone to thermal distortions, which thermal distortions produce a variation in the width of the flow channel.

Accordingly, a primary object of the present invention is to provide a laser power meter which converts incident laser radiation to thermal energy and transfers the thermal energy to a cooling fluid flow, the temperature rise and rate of flow of the cooling fluid defining a measure of the power output of the laser.

Another object of the present invention is to provide apparatus for automatically adjusting the width of a flow channel conducting a flow of cooling fluid in heat exchange relation with an optic of the laser power meter of the present invention, which optic absorbs a portion of the incident laser radiation and converts it to thermal energy and is thus prone to thermal distortions which result in variations in the width of the flow channel.

Thus, a laser power meter, according to the present invention, includes conversion means for converting incident laser radiation into thermal energy, which conversion means includes an optic which absorbs incident laser radiation. A fluid channel is provided adjacent the optic, which fluid channel conducts a fluid in heat exchange relationship with the optic, and which fluid channel is defined by a disk which is spaced from the optic. The present invention also includes gap control means, responsive to changes in the shape of the optic, for regulating the spacing between the optic and the disk and thereby regulating the width of the fluid channel.

BRIEF DESCRIPTION OF THE DRAWINGS

A preferred embodiment of the present invention is described with reference to the accompanying drawings wherein like numerals denote like members, and wherein.

DETAILED DESCRIPTION OF THE PREFERRED EMBODIMENT

Figure 1:
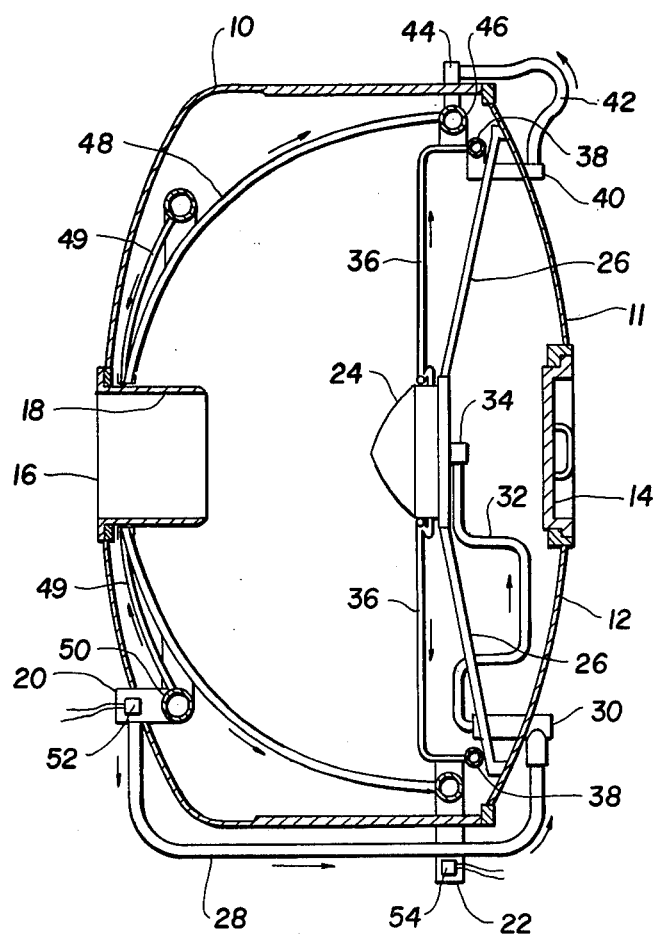
FIG. 1 is a cross-sectional view of a laser power meter, according to the present invention.

With reference to FIG. 1, a preferred embodiment of a laser power meter, according to the present invention, includes a housing 10. The housing 10 is preferably evacuated, and thus constitutes a vacuum chamber. The rear of the housing 10 includes a hingedly mounted door 12 which provides access to the interior of the housing, and the door 12 includes an access port 14 which also permits access to the interior of the housing 10.

The front of the housing 10 includes an optical inlet or window 16 through which laser radiation may be transmitted to the interior of the housing 10. Mounted on an inner surface of the front of the housing 10 adjacent the periphery of the window 16 is a backscatter shield 18 which prevents laser radiation transmitted into the interior of the housing 10 and reflected from surfaces within the housing 10 from passing back out through the window 16.

A fluid inlet 20 extends through an aperture near the bottom of the front of the housing 10, while a fluid outlet 22 extends through an aperture in the base of the housing 10, adjacent the rear of the housing 10. The fluid inlet 20 and fluid outlet 22 provide for an inflow and outflow of cooling fluid, which fluid flows through conduits in the housing 10 to absorb heat from apparatus within the housing 10 heated by the impingement of laser radiation transmitted through the window 16.

Mounted within the housing 10, in axial alignment with the window 16, is a reflecting optic or surface 24. A longitudinal axis of the optic 24 is aligned with a longitudinal axis of the window 16. The optic 24 is mounted within the housing 10 by means of a spider or framework 26. The optic 24 is generally hemispherical in shape and may, for example, have the shape of a rounded cone. In cross-section, the outer surface of the optic 24 is arcuate or curved. The optic 24 absorbs a portion of the incident laser radiation transmitted through the window 16, converting the absorbed laser radiation into thermal energy, and reflects a portion of the incident laser radiation.

The heat generated at the surface of the optic 24 when it absorbs a portion of the incident laser radiation transmitted through the window 16 is transferred to a cooling flow of fluid which is in heat exchange relation with the optic 24. This cooling flow of fluid is communicated to the optic 24 by a series of interconnected conduits, including a generally U-shaped conduit 28 which passes around the base of the housing 10. One end of the conduit 28 communicates with the fluid inlet 20 at the front of the housing 10, while the opposite end of the conduit 28 communicates with a tube 30 which projects into the interior of the housing 10 through an aperture near the bottom of the back wall of the housing 10. The tube 30 communicates with a serpentine tube 32 in the housing 10, which tube 32 in turn communicates with a tube 34 at the rear of the optic 24. The tube 34, whose longitudinal axis is aligned with the longitudinal axis of the optic 24, directs cooling fluid axially to a fluid channel adjacent the rear surface of the optic 24, which fluid channel is described more fully below. The cooling fluid flowing through this fluid channel absorbs heat from the optic 24, and then flows radially outwardly, away from the optic 24, through radially directed tubes 36. The radially directed tubes 36, which are referred to herein as the back coil, intersect a circular manifold 38 of relatively small diameter, which manifold communicates with a right-angle tube 40 provided near the top of the housing 10. The right angle tube 40, which projects through an aperture in the rear wall of the housing 10, communicates with a sinuous tube 42 which in turn communicates with a tube 44 at the top of the housing 10, which tube 44 projects downwardly into the interior of the housing 10 through an aperture in the top wall of the housing 10. The tube 44 intersects a circular discharge manifold 46 of relatively large diameter, which discharge manifold is provided near the rear of the housing 10 and which encircles the optic 24 and the back coil 36. The discharge manifold 46 intersects, and thus communicates with, the fluid outlet 22 near the base of the housing 10.

Substantially all of the laser radiation reflected by the optic 24 is intercepted by a series of interconnected, curved fluid conduits interlaced to form a substantially concave or hemispherical surface, which conduits are denoted herein as the primary coil 48. The primary coil 48 is arranged near the front of the housing 10, facing the optic 24. The conduits of the primary coil 48 are configured so as to encircle the backscatter shield 18. When laser radiation is reflected from the optic 24, this laser radiation impinges on the primary coil, heating the conduits of the primary coil. This heat is absorbed by the cooling fluid flowing through the primary coil 48, which cooling fluid is supplied to the primary coil through a circular feed manifold 50 arranged near the front of the housing 10. The feed manifold 50 encircles the backscatter shield 18 and communicates with the conduits of the primary coil 48 through curved conduits 49 which project downwardly and upwardly from the feed manifold 50 and centrally intersect the primary coil 48 near the backscatter shield 18. The feed manifold 50 is supplied with cooling fluid through the fluid inlet 20, which fluid inlet intersects the feed manifold 50 near the bottom of the housing 10. Fluid discharged from the primary coil 48 flows out through curved conduit components of the primary coil 48 near the top and bottom of the housing 10, which curved conduits intersect the discharge manifold 46 near the top and bottom of the housing 10.

A temperature sensor 52 is provided within the fluid inlet 20 to sense the temperature of the incoming cooling fluid, while a temperature sensor 54 is provided within the fluid outlet 22 to sense the temperature of the heated fluid flowing out through the outlet 22. The temperature difference between the fluid at the inlet 20 and the fluid at the outlet 22, coupled with the flow rate of the fluid, is determinative of one measure of the average power across the beam of the laser radiation transmitted through the window 16.

When the laser radiation impinges upon the surface of the optic 24, and consequently heats the optic, the optic is prone to suffer thermal distortions. These thermal distortions may result in the optic expanding, and thus the radius of curvature of the optic may increase. As a result, and as is explained below, the width of the fluid channel adjacent the optic, which fluid channel conducts cooling fluid in heat exchange relation with the optic, will increase. It is to be noted that a pressure of the fluid in the fluid channel can also produce distortions in the shape of the optic. If the flow rate of the cooling fluid in the fluid channel remains constant, then the velocity of the cooling fluid in the fluid channel must necessarily decrease in response to an increase in the width of the fluid channel. This reduction in fluid velocity results in a degradation of the convective transfer of heat from the optic to the cooling fluid effected by the flow of cooling fluid. This problem is solved by particular features of the present invention described below.

Figure 2:
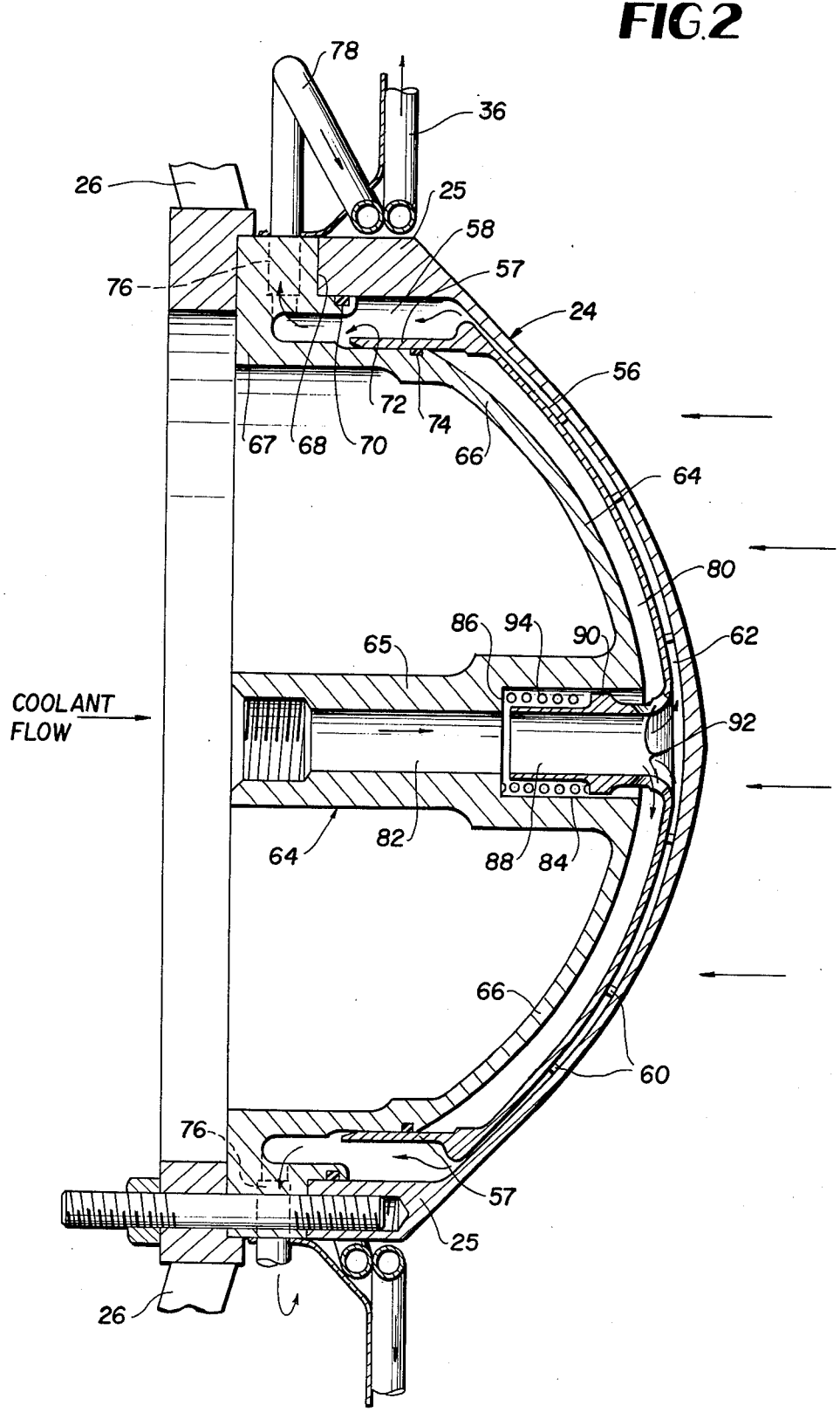
FIG. 2 is an enlarged cross-sectional view of the optic, gap control disk, and closure plug used in the laser power meter shown in FIG. 1.

With reference to FIG. 2, there is shown the generally hemispherical optic reflecting surface 24 of the present invention. As shown, the optic 24 is arcuate in cross-section with a shape akin to that of a rounded cone. Connected to the outer or radial ends of the optic 24 is a ringlike portion 25 extending to the left in FIG. 2. The arcuate portion of the optic 24 is generally of uniform thickness, with the ringlike portion 25 also being of uniform, but greater thickness than the arcuate portion.

Arranged adjacent to, but spaced from the optic 24, is a flexible disk 56, which is referred to herein as the gap control disk 56. The gap control disk 56 is also arcuate in cross-section and has a generally hemispherical shape which generally conforms to the shape of the optic 24. Connected to outer or radial ends of the gap control disk 56 is a ringlike portion 57 extending to the left in FIG. 2. The outer surface of the ringlike portion 57 of the gap control disk 56 is of smaller diameter than the inner surface of the ringlike portion 25 of the optic 24, thereby defining an annular space 58 between the ringlike portions 57 and 25. The gap control disk 56, which is relatively thin as compared to the optic 24, may have a thickness of 0.050 inches, and may be manufactured from aluminum.

As noted above, the gap control disk 56 is spaced from the optic 24, the space between the two defining a generally hemispherical flow channel 62 which conducts cooling fluid in heat exchange relation with the optic 24. The cooling fluid absorbs heat from the optic 24, which heat is produced when laser radiation impinges upon the outer surface of the optic 24. As discussed more fully below, cooling fluid is supplied axially, i.e. along the longitudinal axis of the optic 24, to the flow channel 62. This fluid then flows outwardly through the hemispherical flow channel 62 toward the annular space 58 between the ringlike portions 25 and 57. Because the dominant mechanism for transferring heat from the optic 24 to the cooling fluid is convection, and in order to ensure that the rate of heat transfer is substantially uniform throughout the flow channel 62, fluid velocities throughout the flow channel 62 must be substantially uniform. If the volumetric flow rate of the cooling fluid delivered axially to the flow channel 62 is substantially constant, and if fluid velocities are to be uniform throughout the flow channel 62, then it follows that the width of the flow channel 62, i.e. the space between the optic 24 and the gap control disk 56, must decrease as one moves radially or laterally away from the longitudinal axis of the optic 24. This follows because if one were to take vertical (as viewed in FIG. 2) cross-sections through the hemispherical flow channel 62, and if the width of the flow channel 62 were to remain constant, then the frontal area presented to fluid flow would necessarily increase as one moves radially or laterally away from the longitudinal axis of the optic 24. This increasing frontal area implies, if flow rate were to remain constant, that fluid velocity would necessarily decrease. Thus, to maintain a constant frontal area to fluid flow and thus maintain substantially uniform fluid velocities throughout the flow channel 62, the width of the flow channel is reduced as one moves radially or laterally away from the longitudinal axis of the optic 24. The width of the flow channel may, for example, vary from a maximum of 0.120 inches near the longitudinal axis of the optic 24, to a minimum of 0.020 inches adjacent the annular space 58.

Mounted on the outer surface of the gap control disk 56 is a plurality of rows of cylindrical protrusions or stand-offs 60. As is explained below, the present invention includes apparatus for continuously urging the gap control disk 56 to move toward the optic 24 to bring the stand-offs 60 into contact with the inner surface of the optic 24. Thus, the height of the stand-offs 60 defines the width of the flow channel 62. In order that the width of the flow channel 62 decrease as one moves laterally away from the longitudinal axis of the optic 24, the height of the stand-offs decreases as one moves laterally away from the longitudinal axis of the optic 24.

Arranged adjacent to, but spaced from, the gap control disk 56 is a closure plug 64. In cross-section, the closure plug 64 has the shape of a ship's anchor, with a cylindrical central member 65 connected to outwardly curved arms 66. A longitudinal axis of the cylindrical, central member 65 is coincident with the longitudinal axis of the optic 24. Also, the outer surfaces of the arms 66 define a generally hemispherical surface which generally conforms to the shape of the inner surface of the gap control disk 56. The space between the hemispherical outer surface of the closure plug 64 and the inner surface of the gap control disk 56 defines a hemispherical annulus or reservoir 80 whose function is explained below.

Connected to the outer ends of the curved arms 66 of the closure plug 64 is a ringlike member 67. The ringlike member 67 is contoured so as to sealingly engage both of the ringlike portions 25 and 57 extending, respectively, from the optic 24 and the gap control disk 56. The ringlike member 67 includes a shoulder 68 which receives and mates with the left end (as viewed in FIG. 2) of the ringlike portion 25 and a circular seal or O-ring 70 is arranged between them. Furthermore, the ringlike member 67 includes an annular groove or notch 72 in the right side of the ringlike member 67, just below the shoulder 68. The ringlike portion 57 of the gap control disk 56 projects into this annular groove, the lower surface of the ringlike member 57 being in contact with, and overlying, the upper surface of the ringlike member 67, and with a circular seal or O-ring 74 being arranged between these surfaces. The annular groove 72 and the annular space 58 between the ringlike portions 25 and 57 define one continuous annular space which is hereinafter denoted the annular space 58. Opposed vertical bores 76 in the ringlike member 67 communicate the annular space 58 to curved tubes 78, which communicate with the radially directed tubes of the back coil 36.

The cylindrical, central member 65 of the closure plug 64 includes a longitudinal bore 82 which extends left-to-right (as viewed in FIG. 2) through a portion of the central member 65. The left end of the bore 82 communicates with the tube 34 (not shown in FIG. 2) which supplies cooling fluid axially to the longitudinal bore 82. A longitudinal counterbore 84, of greater diameter than the longitudinal bore 82, extends through the remaining portion of the central member 65, the intersection of the bores 82 and 84 defining an internal shoulder 86. The right end of the bore 84 communicates with the reservoir 80.

Connected centrally to the gap control disk 56, and extending to the left into the counterbore 84, is a hollow cylinder 88. The hollow cylinder 88 includes a radial shoulder 90 which encircles its outer surface at about the midpoint of the length of the cylinder. The right end (as viewed in FIG. 2) of the hollow cylinder 88 is arranged within an aperture in the gap control disk 56 and communicates with the flow channel 62. The cylinder 88 also includes radial bores 92 in its side wall near the right end of the cylinder, which radial bores provide for fluid communication between the cylinder 88 and the reservoir 80.

A spring 94 encircles a portion of the cylinder 88 in the counterbore 84. The left end of the spring 94 (as viewed in FIG. 2) abuts the internal shoulder 86 formed by the intersection of the bore 82 and the counterbore 84, while the right end of the spring 94 abuts the radial shoulder 90 encircling the cylinder 88. The function of the spring 94 is to urge the cylinder 88, and thus the gap control disk 56, toward the optic 24.

When coolant fluid is supplied axially by the tube 34 to the bore 82 in the cylindrical, central member 65 of the closure plug 64, this coolant fluid flows through the bore 82 and into the hollow cylinder 88 in the counterbore 84. A portion of the fluid flowing through the hollow cylinder 88 flows axially through the right end of the cylinder 88 into the flow channel 62, while a portion flows radially through the radial bores 92 in the side wall of the hollow cylinder 88 into the reservoir 80. The fluid flowing into the flow channel 62 flows radially outwardly through the flow channel 62, into the annular space 58, through the vertical bores 76 in the ringlike member 67, and then out through the curved tubes 78 to the back coil 36.

The fluid flowing into the reservoir 80, on the other hand, must come to rest within the reservoir 80 since the reservoir 80 does not communicate with any other flow channel. Because the total pressure (the sum of the static and dynamic pressures) of the fluid entering the flow channel 62 and the reservoir 80 must be the same, and because the fluid in the reservoir 80 is brought to rest, it follows that the dynamic pressure of the fluid in the reservoir 80 is converted into static pressure, and thus the static pressure of the fluid in the reservoir 80 is necessarily greater than the static pressure of the fluid in the flow channel 62. This difference in the static pressure results in a distributed force all along the gap control disk 56, constantly urging the gap control disk 56 toward the optic 24, and thus forcing the stand-offs 60 on the gap control disk 56 into contact with the optic 24. Thus, this difference between the static pressures of the fluid in the reservoir 80 and the flow channel 62, in conjunction with the biasing force exerted by the spring 94, acts to automatically regulate the width of the flow channel 62.

When laser radiation impinges upon the surface of the optic 24, a portion of this laser radiation is absorbed and converted into thermal energy. This heating may cause the optic 24 to suffer thermal distortions which may cause the optic to expand and thus result in an increase in the radius of curvature of the optic 24. This increase in the radius of curvature implies that the optic 24 is moving away from the gap control disk 56, and thus the width of the flow channel 62 is increasing. The difference in the static pressures of the fluid flowing into the reservoir 80 and the flow channel 62, in conjunction with the biasing force exerted by the spring 84, acts to automatically compensate for this increase in the width of the flow channel 62 by constantly urging the gap control disk 56 to move toward the optic 24 until the standoffs 60 on the gap control disk 56 come into contact with the optic 24, and the original width of the flow channel 62 is re-established.

With reference once again to FIG. 1 as well as FIG. 2, the operation of the present invention is as follows. A laser beam is directed through the optical window 16 in the housing 10. The laser radiation will impinge the surface of the optic 24, a portion of the laser radiation being absorbed and converted into heat, and a portion of the laser radiation being reflected. The heat generated by the absorbed laser radiation is transferred to the cooling fluid flowing through the flow channel 62 defined by the space between the optic 24 and the gap control disc 56, the width of which space is defined by the height of the stand-offs 60 on the gap control disk 56. This cooling fluid originates, of course, at the coolant inlet 20, flows through the U-shaped tube 28 to the tube 30, flows through the serpentine tube 32 into the tube 34, which tube 34 delivers the cooling fluid axially to the flow channel 62 and reservoir 80. After flowing through the flow channel 62 and absorbing heat from the optic 24, the cooling fluid flows radially outwardly away from the optic 24 through the back coil 36, to the circular manifold 38, through the right-angle tube 40, into the sinuous tube 42, through the tube 44 at the top of the housing 10, through the discharge manifold 46, and then out through the coolant outlet 22.

The laser radiation reflected by the optic 24 is reflected onto the hemispherical surface formed by the curved tubes of the primary coil 48. These tubes absorb the reflected laser radiation and convert it to heat which is transferred to the cooling fluid flowing through the tubes of the primary coil 48. The cooling fluid flowing through the primary coil 48 originates at the coolant inlet 20, flows into the circular feed manifold 50, through the tubes 49 and into the primary coil 48. This cooling fluid then flows from the primary coil 48 into the discharge manifold 46 and then out through the coolant outlet 22.

The difference in the temperatures of the cooling fluid sensed by the temperature sensors 54 and 52 located, respectively, at the coolant outlet 22 and coolant inlet 20, coupled with the known flow rate of the cooling fluid, defines one measure of the power of the laser beam.

In the event that the optic 24 suffers thermal distortions which produce an increase in its radius of curvature and thus produce an increase in the width of the flow channel 62, the difference in the static pressures of the cooling fluid in the reservoir 80 and the flow channel 62, coupled with the biasing force exerted by the spring 94, will cause the gap control disk 56 to move toward the optic 24 until the stand-offs 60 contact the optic 24 and the original width of the flow channel 62 is re-established.

An advantage of the present invention is that the present invention includes apparatus for automatically regulating the width of the flow channel adjacent the optic of the present invention, which flow channel conducts cooling fluid in heat exchange relation with the optic to maintain a fixed width.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive.

I wish it to be understood that I do not desire to be limited to the exact details of construction shown and described, for obvious modifications can be made by a person skilled in the art.

What is claimed:

1. A laser power meter, comprising:
   conversion means for converting incident laser radiation into thermal energy, which conversion means includes an optic which absorbs and converts at least a portion of the incident laser radiation into thermal energy;

a fluid channel adjacent said optic, which fluid channel conducts a fluid in heat exchange relationship with said optic, and which fluid channel is defined by a disk which is spaced apart from said optic; and gap control means, responsive to changes in the shape of said optic, for regulating the spacing between said optic and said disk and thereby regulating the width of said fluid channel.

2. Apparatus in accordance with claim 1 wherein said gap control means includes means for urging said disk toward said optic.

3. Apparatus in accordance with claim 2 wherein said means for urging said disk toward said optic includes a fluid chamber adjacent said disk, a pressure of the fluid in said fluid chamber being greater than a pressure of the fluid in said fluid channel.

4. Apparatus in accordance with claim 2 wherein said gap control means further includes a plurality of stand-offs mounted on said disk and facing said optic, the height of the stand-offs defining the spacing between said disk and said optic.

5. Apparatus in accordance with claim 3 wherein said fluid chamber is defined by a space between said disk and a closure plug.

6. Apparatus in accordance with claim 5 wherein said closure plug includes a bore extending through a portion of the closure plug, and an intersecting counterbore of larger diameter than said bore extending through the remainder of said closure plug, said bore and said counterbore defining a fluid flow path through said closure plug through which fluid is supplied to said fluid channel and said fluid chamber.

7. Apparatus in accordance with claim 6 wherein said means for urging said disk toward said optic further includes:
   a hollow cylinder connected to said disk and extending into said counterbore, said cylinder having a shoulder on its outer surface; and
   a spring arranged within said counterbore and encircling said hollow cylinder, one end of said spring being in contact with the internal shoulder formed by the intersection of said bore and said counterbore and the opposite end of said spring being in contact with the shoulder on the outer surface of said hollow cylinder.

8. Apparatus in accordance with claim 7 wherein said hollow cylinder includes first and second opposed ends, said first end being connected to said disk and arranged within an aperture in said disk, said first end communicating with said fluid channel and said second end extending into said counterbore.

9. Apparatus in accordance with claim 8 wherein said hollow cylinder includes radial bores in a sidewall of said hollow cylinder adjacent said first end, which radial bores communicate with said fluid chamber.

10. Apparatus in accordance with claim 1 wherein said optic is arcuate in cross-section and said disk is arcuate in cross-section.

11. Apparatus in accordance with claim 5 wherein said closure plug includes an outer surface which is arcuate in cross-section.

12. A laser power meter, comprising:
   a housing having an optical window through which laser radiation is transmitted, as well as a fluid inlet and a fluid outlet;
   an optic arranged within said housing in alignment with said window, which optic absorbs a portion of the laser radiation transmitted through said window and reflects a portion of the laser radiation, the absorbed laser radiation being converted to thermal energy;
   a first fluid flow path through said housing connecting said fluid inlet and fluid outlet, which first fluid flow path conducts cooling fluid through said housing, and which first fluid flow path includes a fluid channel adjacent said optic;
   a disk arranged within said housing adjacent to, and spaced from, said optic, the space between said disk and said optic defining said fluid channel;
   means for regulating the width of the space between said optic and said disk, which means is responsive to changes in the width of said space produced by changes in the shape of said optic; and
   a second fluid flow path through said housing connecting said fluid inlet and said fluid outlet, which second fluid flow path also conducts cooling fluid through said housing, and which second fluid flow path includes a plurality of interconnected fluid conduits interlaced to form a substantially hemispherical surface arranged in the path of the laser radiation reflected by said optic.

13. Apparatus in accordance with claim 12 wherein said housing is under vacuum.

14. A laser power meter, comprising:
   conversion means for converting incident laser radiation into thermal energy, which conversion means includes an optic which absorbs and converts at least a portion of the incident laser radiation into thermal energy;
   a fluid channel adjacent said optic, which fluid channel conducts a fluid in heat exchange relationship with said optic, and which fluid channel is defined by a disk which is spaced apart form said optic; and
   gap control means, responsive to changes in the shape of said optic, for regulating the spacing between said optic and said disk and thereby regulating the width of said fluid channel; said gap control means including
   means for urging said disk toward said optic, and
   a plurality of stand-offs disposed within said fluid channel, the heights of said stand-offs defining the spacing between said disk and said optic.

15. Apparatus in accordance with claim 14 wherein said stand-offs are mounted on said disk facing said optic.

* * * * *